Dec. 16, 1947.   R. W. CROTHERS ET AL   2,432,727
APPARATUS FOR DETERMINING GAUGE OF METAL STRIP
Filed May 31, 1944          5 Sheets-Sheet 1
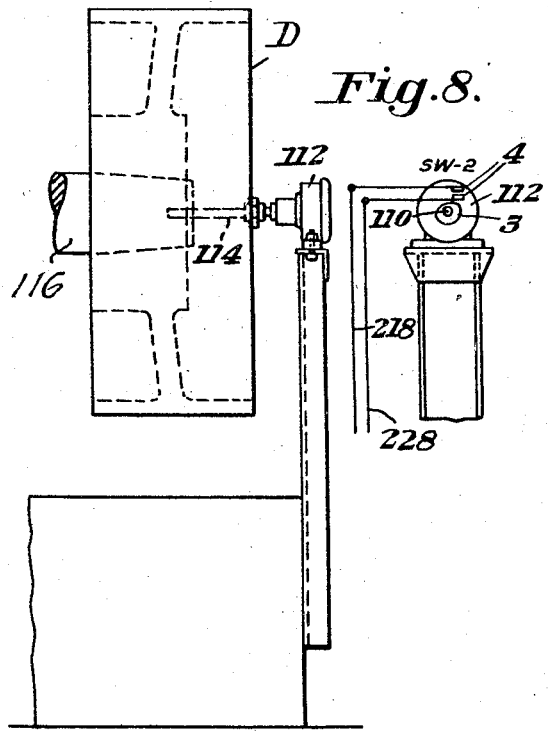
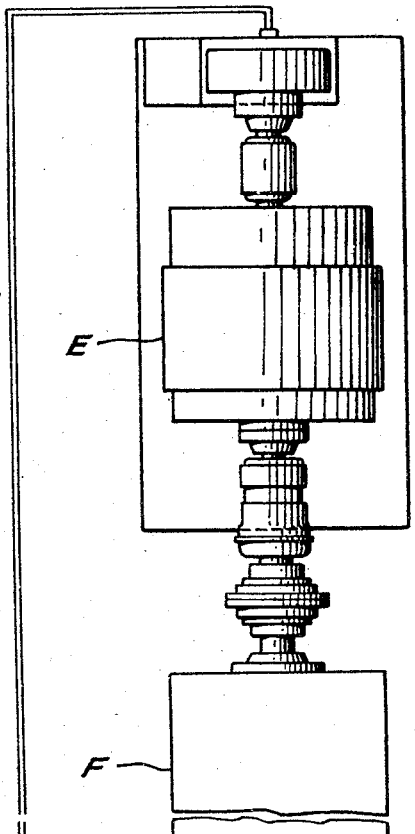
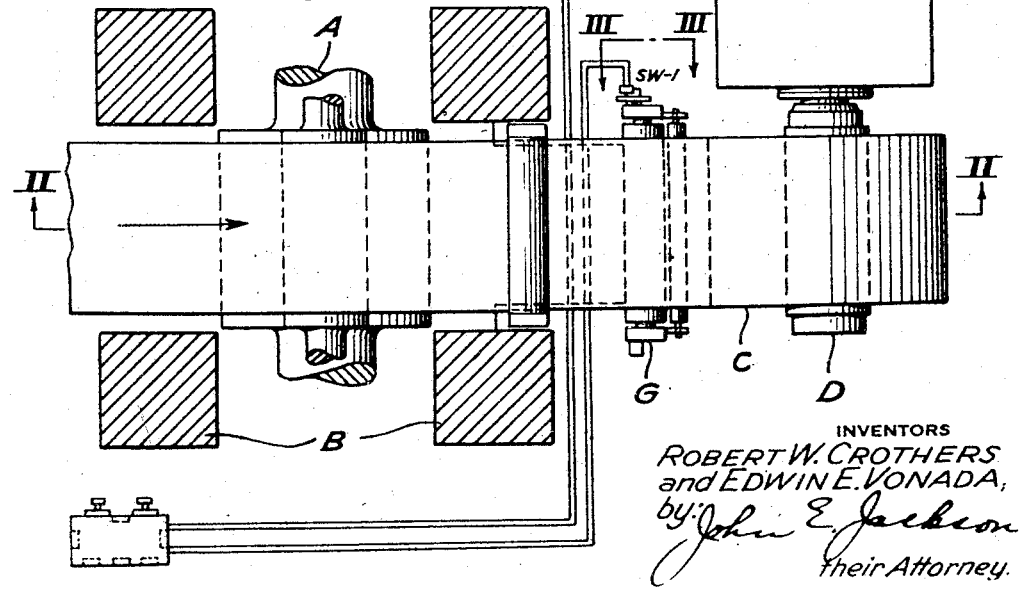
INVENTORS
ROBERT W. CROTHERS
and EDWIN E. VONADA,
by John E. Jackson
their Attorney.

Dec. 16, 1947.    R. W. CROTHERS ET AL    2,432,727
APPARATUS FOR DETERMINING GAUGE OF METAL STRIP
Filed May 31, 1944    5 Sheets-Sheet 2
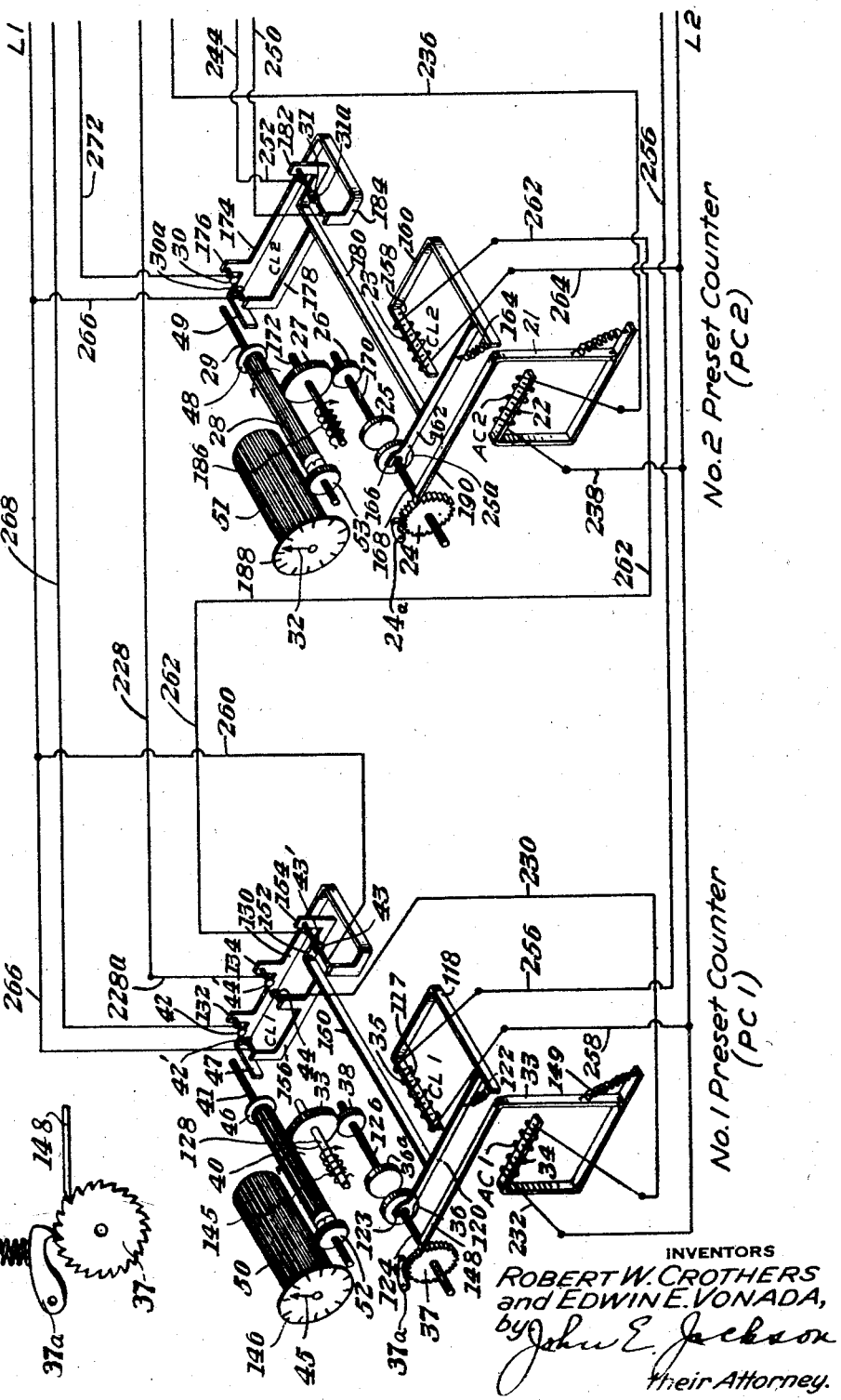
INVENTORS
ROBERT W. CROTHERS
and EDWIN E. VONADA,
by John E. Jackson
their Attorney.

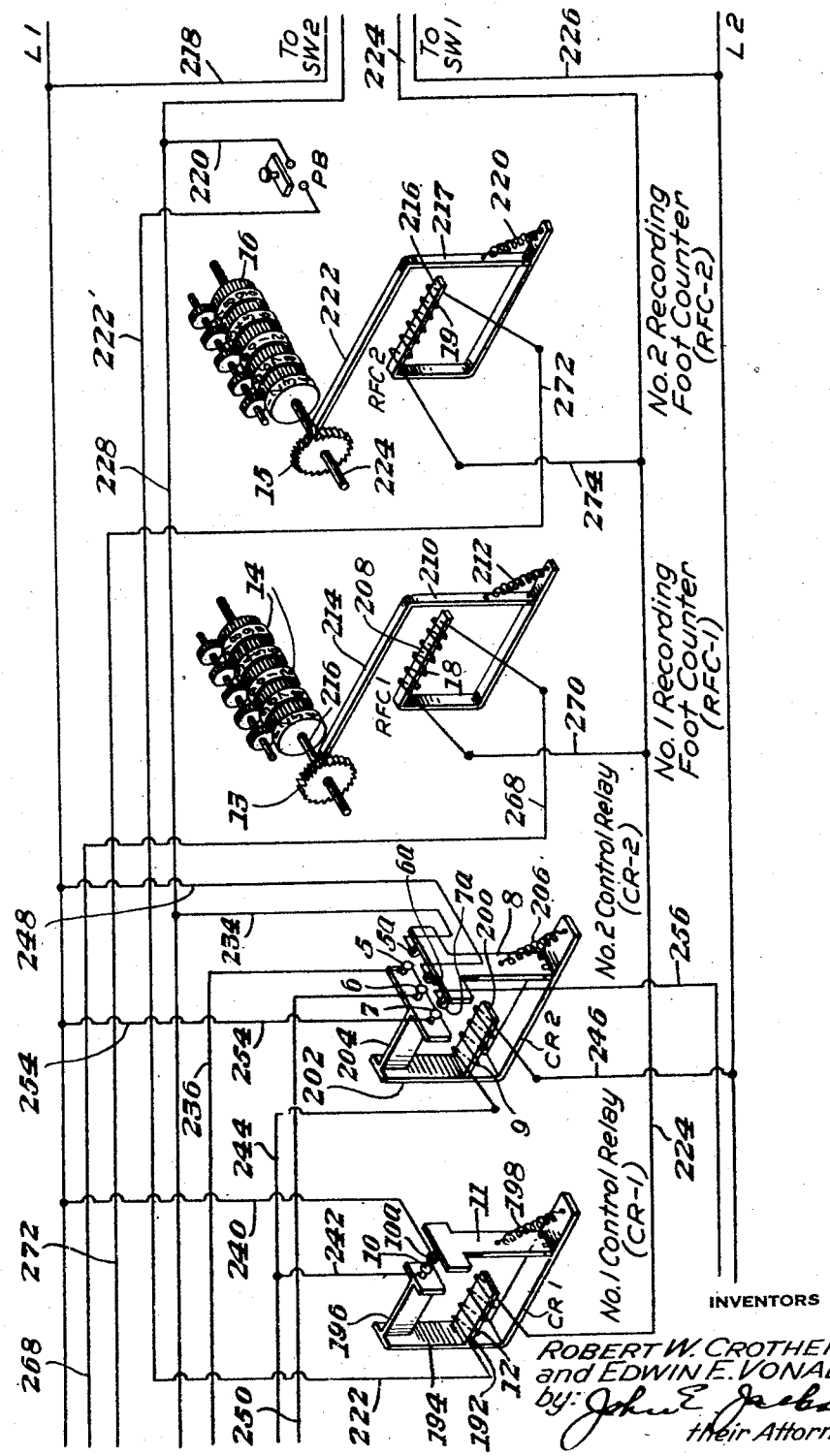

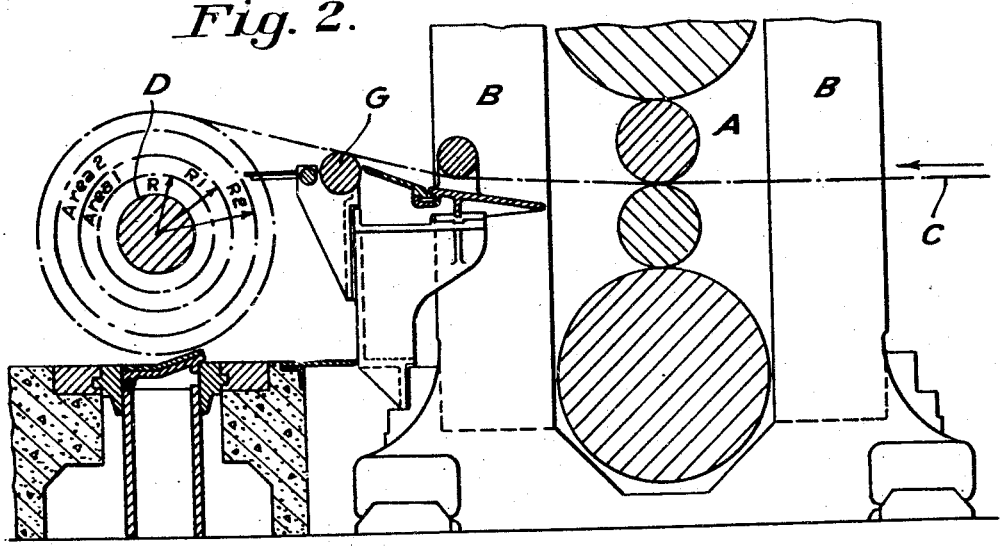
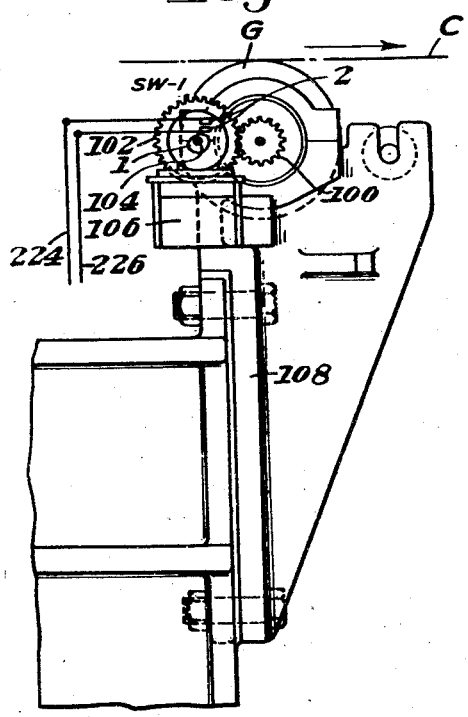
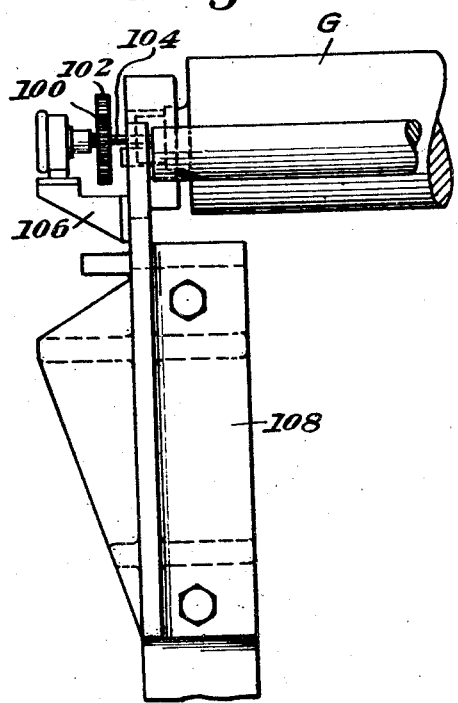

Dec. 16, 1947.   R. W. CROTHERS ET AL   2,432,727
APPARATUS FOR DETERMINING GAUGE OF METAL STRIP
Filed May 31, 1944   5 Sheets-Sheet 5

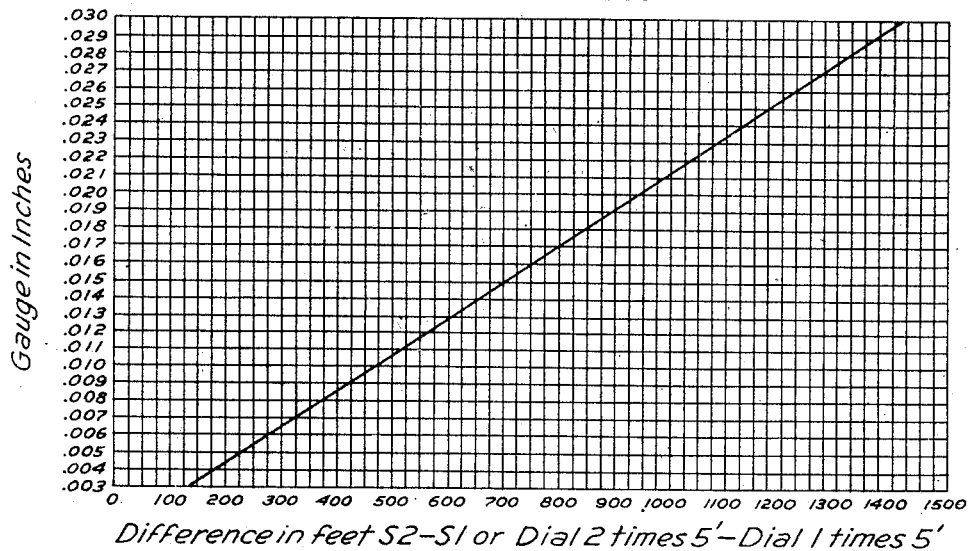

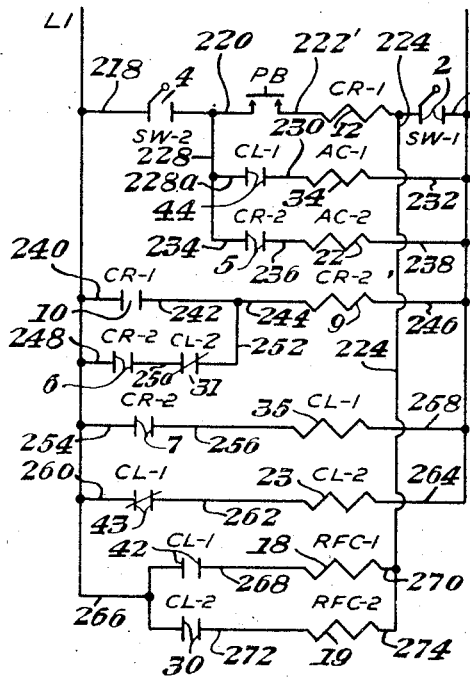

KEY
PB  – Push Button
CR-1- Control Relay
CR-2- Control Relay
SW-1- Rotary Switch on Length Measuring Roll "G"
SW-2- Rotary Switch on Coiler
AC-1- Operating Coil in Preset Counter #1
AC-2- Operating Coil in Preset Counter #2
CL-1- Clutch and Contacts in Preset Counter #1
CL-2- Clutch and Contacts in Preset Counter #2
RFC-1- No.1 Recording Foot Counter
RFC-2- No.2 Recording Foot Counter INVENTORS
ROBERT W. CROTHERS
and EDWIN E. VONADA,
by: John E. Jackson
their Attorney.

Patented Dec. 16, 1947

2,432,727

UNITED STATES PATENT OFFICE 2,432,727

APPARATUS FOR DETERMINING GAUGE OF METAL STRIP

Robert W. Crothers, Pittsburgh, and Edwin E. Vonada, McKeesport, Pa.

Application May 31, 1944, Serial No. 538,148

6 Claims. (Cl. 33—125)

In the production of metal strip, such as steel strip, for example, it is very desirable to know the average thickness or gauge of the strip after it has been cold reduced, and prior to further processing.

In the past, prior to the present invention, average gauge could not be checked while the strip was being rolled and coiled on a reel, average gauge being checked by weight after the strips or sheets were sheared to size. Such procedure required further processing after being cold reduced, this processing requiring about two weeks before the gauge of the sheets could be checked. Therefore, it was possible for many coils of strip made during the said period of time to be "off-gauge," this "off-gauge" being strip that does not meet gauge tolerances specified by the order.

Proposals have been made for determining instantaneous gauge while rolling. However, all of such proposals are unsatisfactory and unreliable in performance. Thus, it is customary practice to attempt to show instantaneous gauge on a meter connected to a so-called "flying micrometer" which is an electric limit gauging device of a known type. Such device is intended to show instantaneous thickness of steel strip to about two inches from the edge as it is being coiled. However, heat in the device and wave motion of the strip cause the meter to show "off-gauge" on the high side, which makes the operator think that the strip is being rolled too thick. In order to correct this apparent off-gauge, the operator adjusts the rolls to bring them closer together until the meter indicates the proper gauge, whereas, in reality, the strip is off-gauge on the low side. Furthermore, the adjustment of the rolls is accomplished by application of screw pressure on the ends of the rolls. Such pressure causes the rolls to bend very slightly, but measurably, resulting in a crown being rolled in the strip along the center portions thereof.

An additional prior procedure constitutes actual measurement of the radial thickness of a certain number of wraps on the coil after the material is rolled. This is a direct radial measurement between two markers placed in the coil after it is rolled. The mill operator places two markers between the wraps of the coil after it is formed on the reel. These markers project from the end of the coil and the distance between them is measured by hand after the coil is removed from the coiler mandrel.

The present invention provides an apparatus and mode of operation for accurately determining the average gauge without delay and without requiring preliminary preparation or special attention to obtain the desired results. In accordance with the present invention, the gauge of the strip also may be determined in a portion of a coil and the necessary adjustments made on the mill to change the gauge before the rolling of the coil is completed. Generally speaking, the present invention provides apparatus for determining reliably the average thickness, or gauge, of the strip as it is finished and coiled in cold reduction mills.

The apparatus of the present invention provides an accurate procedure and means of checking the average gauge of the strip as it is coiled at the mill. The gauge is read directly from a prepared chart.

The apparatus of the present invention is based on the principle that the number of feet of strip which is required to make any particular number of wraps around a mandrel or part of a coil is a function of the gauge. This principle is used at two successive portions of the coil. In operation, the number of feet of strip is measured over a guide roller while six hundred revolutions of the reel are counted. The number of feet of strip is recorded on a first recorder for the first three hundred revolutions of the reel and on a second and similar recorder for the second three hundred revolutions of the reel. The transfer from the first recorder to the second recorder is accomplished by two similar preset counting devices. The number of feet required for the first three hundred wraps is subtracted from the lineal feet of strip in the second three hundred wraps. This difference multiplied by a factor, 0.00002122, which will be derived hereinafter, gives the actual average thickness of the strip.

The above referred to elements of the apparatus of the present invention will be described in particularity hereinafter.

The invention will be understood more readily by reference to the accompanying drawings, wherein:

Figure 1 is a diagrammatic plan view of the finishing end of a cold reduction strip mill with the apparatus of the present invention applied thereto;

Figures 1A and 1B, taken together, constitute a physical wiring diagram of preset and recording counting mechanism employed in the present invention, the views showing the mechanical construction of these mechanisms, as well as the electrical connections thereof;

Figure 2 is a fragmentary sectional elevation of a coiling end of a cold reduction mill, taken on line II—II of Figure 1, looking in the direction of the arrows;

Figure 3 is a fragmentary sectional elevation of the apparatus shown in Figure 1, the view being taken as looking along the line III—III of Figure 1, in the direction of the arrows;

Figure 4 is a view similar to Figure 3 but looking at right angles to Figure 3;

Figure 5 is a fragmentary side elevation showing the mounting of a timing switch at the coiler;

Figure 6 is a schematic wiring diagram of the system;

Figure 7 is a graph of average gauge values plotted from data obtained by operation of the present mechanism;

Figure 8 is a front view of a switch member on the coiler shown in Figure 5, the view being taken at right angles to Figure 5; and Figure 9 is an enlarged view showing the ratchet 37 and associated mechanism, it being understood that the same mechanism is used in conjunction with ratchet 24.

It will be understood that the strip is being rolled through a continuous train of mills.

The foregoing statements will be amplified and explained hereinafter as the description proceeds. It is realized that in the above, and in the following description, customarily used reference characters have been supplemented by designations of self-explanatory characters as adding to clarity of understanding in reading the wiring diagrams. It may be noted in this connection, that each particular unit employed in the system of the invention, is a known standard device, procurable on the open market.

The designations as employed in the wiring diagram of Figures 1A, 1B and 6, are reproduced on the drawings under the legend "Key" of Figure 6, for clarity and are self-explanatory.

Reference again may be had to the details shown on the drawings, it being understood that the invention includes the interrelationship of the various units and the coordinated functions of operation resulting from such interrelationship, rather than, primarily, in the mechanical constructions of the units themselves.

The invention will be understood more readily from the accompanying drawings, wherein A represents the last stand of rolls in a cold reduction mill, the rolls of which are mounted in frame B. The strip, of which the gauge to be determined, is indicated at C, the strip, as finished in the roll stand A being wound on coiler D, which is powered by a motor E. The motor E drives the coiler D through suitable speed reducing mechanism F. A guide roll G for the strip is mounted between roll stand A and the coiler D.

It will be observed from Figure 3 that the guide roll G has mounted on its shaft, a pinion 100, which engages a gear 102 mounted on a shaft 104. The shaft 104 is mounted in suitable bearings in bracket 106 carried by frame member 108. Shaft 104 is shown as carrying a cam 1, which is rotatable with the shaft, rotation of the cam 1 actuating the contacts 2 of SW—1 (Figure 3) to close and open these contacts successively, responsively to rotation of gear 102 and shaft 104, guide roller G being actuated by the strip passing thereover.

Switch SW—2 is so connected to the reel to send an impulse to coils 22 and 34 of the Preset counters for each revolution of the reel.

Switch SW—1 is so connected and geared to the guide roll A to send an impulse to coils 18 or 19 of Recording foot counters RFC—1 or RFC—2 for each five feet of strip travel.

Switch SW—2 is mounted on the coiler D, it being actuated by a cam 3 on shaft 110 rotatably mounted on bearing 112, the shaft 110 being connected to a shaft 114 driven by shaft 116 of the coiler D. Cam 3 actuates contacts 4 of SW—2 to make and break these contacts.

The electrical connections through switches SW—1 and SW—2 will be brought out as the description proceeds. The construction is such that a speed differential exists between cams 1 and 3, and the contacts 2 and 4 are held closed through 180° of the cam travel.

The ratchet devices which are included in the two revolution counters both receive impulses continuously from the reel-operated switch during the first period of three hundred revolutions of the reel, and during this time the first foot counter receives impulses from the guide roll switch. The ratchet device of the second revolution counter engages no counting or other mechanism during this period, but the ratchet device of the first revolution counter is kept in engagement during this time with a counting and screw feed device preset to open and close certain contacts at the completion of three hundred revolutions. The switching operation thereby effected cuts off the impulses to the first revolution counter and puts the ratchet device of the second into engagement with its counting and screw feed device, and at the same time transfers the impulses of the guide roll switch from the first foot counter to the second. After the second period of three hundred revolutions, the screw feed device of the second revolution counter moves other contacts with the effect of disengaging the counting and screw feeding device of the second revolution counter and disconnecting the second foot counter. The two footage values can then be read off, from which the average gauge can be calculated or determined by use of the chart of Figure 7. Each of the revolution counters incorporates a return spring and stop in connection with its counting and feed screw devices so that it returns to its original preset condition as soon as it is disengaged from its ratchet device.

Reference now may be had to Figures 1A and 1B, with particular reference to the mechanical features shown.

Preset counter No. 1 (PC—1) includes a clutch member CL—1, actuated as follows:

An electromagnetic coil 35 is mounted as shown on one arm 117 of a clutch frame 118, energizing of coil 35 moving a pivoted sliding yoke 120 against tension of spring 122 until the sliding yoke engages arm 117 about which the coil is wound. Coil 35 and arm 117 thereby constitute an electromagnet of which the sliding yoke 120 is the armature, and arm 117 is the core. Yoke 120 has a bifurcated end 123 into which is received a shaft 124, which is slidably mounted in suitable supports, not shown, and which carries a ratchet wheel 37 keyed thereon, and friction clutch disc 36, so that when coil 35 is energized so as to pull over yoke 120, clutch disc 36 engages complementary disc 36a mounted on a shaft 126. Shaft 126 carries a pinion 38 which meshes with gear 33 on a stub shaft 128.

This gear 32 meshes with a nut 40 on a fixed screw 41 and can travel therealong until trip 46 on the nut comes into contact with a bar 47, this latter being one side of a contact frame 130. This frame 130 has upstanding lugs 132 and 134 thereon, which carry contacts 42 and 44', respectively, to be referred to hereinafter in greater detail. A spring return 145 is provided for shaft 128.

As is apparent, the purpose of spring 145 in the apparatus of the present invention is to return the nut 40 to its original or home position after trip 46 has contacted bar 47 and deenergized clutch CL—1 and coil AC—1. One end of this spring is securely fastened to shaft 128, while the other end is held stationary. This rotation of shaft 128 puts a tension in the spring 145 which is released, after clutch plates 36 and 36a are disengaged, by rotating shaft 128 in the opposite direction until nut 40 contacts stop gear 52 which is locked in position by presetting dial 146. Gear 52 thus represents a stop associated with the spring return.

Ratchet wheel 37 requires a reverse motion preventing means to counteract the backlash tendency of spring 145 while the clutch plates 36 and 36a are engaged. This reverse motion preventing means consists of a small dog 37a which is pin mounted at one end while the opposite end engages the ratchet teeth. Thus, when the wheel 37 moves forward, the dog merely slips from one notch to that following, but locks in place when wheel 37 tends to revolve in a reverse direction.

The above described movement of the yoke 120 to shift the shaft 124 as described above, brings ratchet wheel 37 into engagement with a bar 148, which bar is actually a part of arm 33 which constitutes an armature for an electromagnetic coil (AC—1), which is indicated at 34. Each time coil 34 is energized, it brings pivoted arm 33 into engagement with it, thereby causing the bar 148 to transmit a mechanical impulse to ratchet 37 to advance gear 40 along screw 41 towards contact bar 47, as will be apparent from the drawings. When coil 34 is not energized, spring 149 holds the bar 148 out of engagement from the ratchet wheel 37.

In addition to its above described function, yoke 120 is an actuating member for a group of electrical contacts. The yoke 120 carries an arm 150 extending horizontally from the yoke at right angles thereto. Arm 150 carries an L-shaped contact member 152 on its end, the member 152 carrying a contact 43 adapted to engage a complementary contact 43' on an upturned end 154 of the contact frame member 130. Arm 150 also carries contact member 156, which is mounted on arm 150 in any suitable manner, the contact member 156 carrying contacts 42' and 44 which are adapted to engage with contacts 42 and 44' on contact member 130.

The mechanical elements on No. 2 Preset counter (PC—2), are similar, in general, in construction and operation, to the foregoing features of No. 1 Preset counter. Reference, however, may be made to the illustrated construction, which likewise embraces an electromagnetic clutch CL—2. This clutch includes coil 23, which is mounted as shown, on an arm 158 of a clutch frame 160, an energizing of the coil 23 moving a yoke bar 162 against tension of spring 164, which spring normally holds yoke bar 162 out of engagement with arm 158, the electromagnetic clutch being actuated by coil 23 and yoke bar 162 as the movable armature contact therefor.

The yoke bar 162 has a bifurcated end 166 which fits over clutch shaft 168, which is slidably mounted in suitable supports, not shown, and which carries a ratchet wheel 24 keyed thereon, together with a friction clutch disc 25a, so that when coil 23 is energized to pull over yoke bar 162, clutch disc 25a engages its complementary disc 25 mounted on a shaft 170. This shaft 170 carries a pinion 26 which meshes with a gear 27 on a shaft 172.

This gear 27 meshes with a nut 28 mounted on a fixed screw 29 until trip 48 on the nut comes into contact with a bar 49, this latter being one side of a contact frame 174. This frame 174 has an upstanding contact lug 176 thereon on which is mounted contact 30, which contact is adapted to engage complementary contact 30a on arm 178. This arm 178 is mounted on a bar 180, this latter bar being mounted in turn on yoke bar 162. Yoke bar 180 has its free end off-set into an L-shaped contact member 182, this member 182 carrying a contact element 31 adapted to engage a complementary contact element 31a on arm 184 of frame 174.

A spring 186 is provided to return the nut 28 to its original position after trip 48 has contacted bar 49 and deenergized clutch CL—2 and coil AC—2. One end of the spring is securely fastened to shaft 172, while the other end is held stationary. Rotation of shaft 172 puts tension on the spring 186 which is released after clutch disks 25 and 25a are disengaged, by rotating shaft 172 in the opposite direction until nut 28 contacts stop gear 53 which is locked in position by presetting dial 188. Gear 53 thus represents a stop associated with the spring return. Ratchet wheel 24 requires a reverse motion preventing means to counteract the backlash tendency of spring 186 while clutch plates 25 and 25a are engaged. This reverse motion preventing means consists of a small dog 24a which is pin mounted at one end while the opposite end engages the ratchet teeth. Thus when the wheel 24 moves forward the dog merely slips from one notch to that following, but locks in place when wheel 24 tends to revolve in a reverse direction.

Energizing coil 23 moves yoke bar 180 towards the right, as viewed in Figure 1A, thereby engaging clutch discs 25, 25a, this movement being directed against tension of the spring 164. Also, as viewed in Figure 1A, this movement will close contacts 30 and 30a and open contacts 31 and 31a.

A pinion 53 on screw 29 meshes with an elongated gear 51 which moves a pointer 32 over the counting range dial 188, the gear 51 being moved forward responsively to engagement of the ratchet wheel 24 with arm 190 of movable contact element 21 each time coil 22 is energized. The energizing of the coil 22 thereby causes the arm 190 to transmit a mechanical impulse to the ratchet wheel 24, each impulse causing the gear 28 to move along fixed screw 29 with respect to contact arm 49.

Reference now may be had to Figure 1B for the mechanical construction of the control relays and the recording foot counters.

No. 1 Control relay (CR—1) includes a coil 12 wound on a bracket 192 of a stand 194. Fixed contact arm 196 has contact element 10 thereon, contact element 10 being adapted to engage the complementary contact element 10a, which is carried on a movable contact arm 11, which, in turn, is controlled by tension of a spring 198.

No. 2 Control relay (CR—2) includes a coil 9 wound on a bracket 200 of a stand 202. Fixed contact arm 204 of the stand carries three contact elements 5, 6 and 7, adapted to engage complementary contact elements 5a, 6a and 7a on movable contact arm 8, which is controlled by a spring 206.

The Recording foot counters (RFC—1 and RFC—2) are ratchet type, advancing a dial one figure for each impulse. On Recording foot counter RFC—1, a coil 18 is mounted on arm 208 as shown. When the coil 18 is energized, it draws arm 210 against the tension of spring 212, this action engaging pawl arm 214 into a notch of ratchet wheel 13 mounted on a shaft 216, which carries dial 14.

The Recording foot counter No. 2 is constructed similarly. Coil 19 is mounted on arm 218, so that when energized, arm 217 is moved against tension of the spring 220 into engagement with the arm 216. This movement engages pawl arm 222 into a notch of ratchet wheel 15, which is mounted on a shaft 224, thereby moving dial 16 one notch.

The electrical system and sequence of operations may now be referred to, reference being had to the wiring diagrams, Figures 6 and 1A and 1B.

The device is set into operation when a push button PB is held closed by the operator, and cams 1 and 3 on the switches SW—1 and SW—2 are in such position that the contacts 2 and 4 are closed. This is accomplished instantly because a speed differential exists between cams 1 and 3, and the contacts 2 and 4 are held closed through 180° of cam travel.

Switches SW—1 and SW—2 are driven mechanically. When push button PB is closed and held in until the cams on SW—1 and SW—2 are both in position to hold their respective switches closed, current flows from line conductor L—1 through conductor 218, contact 4 of switch SW—2, conductor 220, push button PB, conductor 222', relay coil 12 of control relay CR—1, conductor 224, contact 2 on SW—1, through conductor 226 to line conductor L—2. This energizes the coil 12 of control relay CR—1, which closes normally open contacts 10, 10a on the control relay CR—1.

When contacts 10, 10a on CR—1 close, relay coil 9 of control relay, CR—2 is energized, through a circuit consisting of the line conductor L—1, conductor 240, contact 10 of CR—1, conductors 242 and 244, relay coil 9 of control relay CR—2, conductor 246 and back to line L—2.

Energizing of coil 9 of CR—2 closes a self-holding circuit which consists of conductor 248, which connects line conductor L—1 to contacts 6a and 6 on control relay CR—2, thence through conductor 250, thence through contacts 31a, 31 on the clutch (CL—2) of No. 2 Preset counter (PC—2), thence through conductor 252 which taps into conductor 244. This self-holding circuit holds the entire system in operation throughout its entire cycle.

Furthermore, energizing coil 9 of control relay CR—2, completes an impulse circuit to the preset counter coil 22 of Preset counter No. 2 (PC—2). This impulse circuit starts from conductor 220, through conductor 228, through conductor 234 to normally open contacts 5a, and 5, now closed responsively to energizing coil 9, of control relay CR—2, through conductor 236 to coil 22, that is, coil AC—2, both designations being used in order to conform to Figure 1A, of Preset counter No. 2, and thence through conductor 238 to line conductor L—2.

The energizing of the coil 9 also results in closing of contacts 7, 7a on Control relay No. 2. This closing of contacts 7, 7a energizes coil 35 of clutch CL—1 of Preset counter No. 1, through conductor 254 to contacts 7, 7a of Control relay No. 2 to conductor 256 to coil 35 of clutch CL—1 of Preset counter No. 1, to conductor 258 to power line L—2. This energizes coil 35 of clutch CL—1.

When clutch coil 35 is energized, the following actions take place:

Contacts 44 and 44' on clutch CL—1 of Preset counter No. 1 close, and permit impulses to energize coil 34 of Preset counter No. 1, through a circuit which comprises conductor 220, conductors 228 and 228a, through closed contacts 44' and 44 of clutch CL—1, through conductor 230 to coil 34 of Preset counter No. 1, then through conductor 232 to conductor line L—2.

Closing of clutch CL—1 also completes a circuit through now closed contacts 42', 42 to coil 18 of Recording foot counter RFC—1, the circuit being from the line conductor L—1 through conductor 266 to contacts 42', 42 on clutch CL—1, thence through conductor 268 to coil 18 of RFC—1, through conductor 270 to conductor 224 to contacts 2 of switch SW—1, thence through conductor 226 to power line conductor L—2. Energizing coil 18 through impulses from the switch SW—1 actuates the counter mechanism of Recording foot counter RFC—1.

At the end of the preset counting setting of clutch CL—1, contacts 43 and 43' of the clutch close, energizing coil 23 of clutch CL—2 of Preset counter No. 2. This causes the counting mechanism of Preset counter No. 2 to start functioning. Coil 23 is energized from the power line conductor L—1 through conductor 260, thence through contact 43 of Preset counter No. 1, through conductor 262, thence through coil 23 of Preset counter No. 2, thence through conductor 264 to power line conductor L—2.

At the end of the predetermined setting on Preset counter No. 1, contacts 44, 44' of this Preset counter open, thereby breaking the impulse circuit to coil 34 of Preset counter No. 1. Opening of contacts 44, 44' opens contacts 42, 42' of clutch CL—1 of Preset counter 1, breaking the impulse circuit of coil 18 of Recording foot counter 1, thus stopping the count for this part of the cycle.

Normally closed contacts 43, 43' of clutch CL—1, open when coil 35 is energized, then close at the end of the preset counting cycle, energizing coil 23 of clutch CL—2 of Preset counter No. 2, which starts the counting actuation of Preset counter No. 2.

As soon as coil 23 is energized, contacts 30, 30a of clutch CL—2 close, allowing impulses from switch SW—1 to energize coil 19 of RFC No. 2 through a circuit from power line L—1 through conductor 266 to contacts 30a and 30 of Preset counter No. 2 through conductor 272, through coil 19 of Recording foot counter No. 2, through conductor 274 to conductor 224 to contacts 2 of switch SW—1, through conductor 226 to line conductor L—2.

Counter RFC—2 continues to pick up the impulses until the predetermined count of Preset counter No. 2 is reached, when contacts 31 and 31a on Preset counter No. 2 open, thereby deenergizing coil 9 of Control relay CR—2.

With the push button PB and contacts 2 and 4 in the closed positions, coil 12 of Control relay CR—1 is energized, causing armature 11 to operate, closing contacts 10, 10a.

With contacts 10 and 10a closed, coil 9 on Control relay CR—2 is energized, closing contacts 5 and 5a, 6 and 6a, and 7 and 7a of Control relay CR—2. Contacts 6 and 6a being closed, coil 9 on Control relay CR—2 is held in through contacts 31, 31a on clutch CL—2 of Preset counter No. 2, which contacts remain closed at all times until opened at the end of the operation to reset the mechanism. Contacts 7 and 7a are held closed by coil 9 on Control relay CR—2, and thus energizing coil 35 on clutch CL—1 of Preset counter No. 1. Contacts 5 and 5a held closed by coil 9 on Control relay CR—2, and send impulses from switch SW—2 to coil 22 of Preset counter No. 2.

Coil 35 of Preset counter No. 1 is held closed by contacts 7 and 7a on Control relay CR—2, thereby closing contacts 44 and 44' of clutch CL—1 of Preset counter No. 1. Contacts 42 and 42' on clutch CL—1 of Preset counter No. 1, also being held closed, send impulses to energize coil 18 on Recording foot counter RFC—1, through contacts 2 on switch SW—1 each time contacts 2 close. This coil 18 operates ratchet 13, advancing dial 14 one step or number ahead with each impulse received.

Each instant the contacts 2 on switch SW—1 close, coil 34 on Preset counter No. 1 and coil 22 on Preset counter No. 2 will move ratchet wheels 24 and 37 one notch ahead.

As has been indicated previously, coil 35 on clutch CL—1 is energized through contacts 7 and 7a, when clutch members 36 will be closed, connecting the ratchet 37 to gear train 38, 39, which gear train drives the nut 40 on fixed screw 41 until the trip point 46 comes into contact with bar 47. At this point, contacts 42, 42' and 44, 44' open and contacts 43, 43' close.

This action stops Preset counter No. 1 from operating. It also stops Recording foot counter RFC—1 from operating, and energizes coil 23 on Preset counter No. 2, closing clutch members 25, 25a, thereby connecting gear train 26, 27, 28 to ratchet 34 on Preset counter No. 2.

Coil 23 of clutch CL—2 of Preset counter No. 2 closes contacts 30, 30a, contacts 31, 31a remaining closed. Coil 22 of the Preset counter No. 2, still receiving impulses from contacts 4 on switch SW—2, causes the ratchet to advance the gear train 26, 27, 28 which drives gear 28 along a fixed screw 29 until trip point 48 comes into contact with bar 49, thereby opening contacts 30, 30a and 31, 31a. This stops coil 19 on Recording foot counter RFC—2 from receiving impulses from contacts 2 on switch SW—1; and opening of contacts 31 and 31a deenergizes coil 9 of Control relay CR—2. The mechanism thus is reset for the next operation.

When clutches 25 and 36 are opened, gears 28 and 40 automatically return to their original or "home" position, which is determined by the distance the gears 52 and 53 have been moved along the stationary screws 29 and 41 by the arrows 32 and 45 that are connected to gears 51 and 50, respectively. Arrows 32 and 45 have been calibrated so the number on the face thereof will be the required number of impulses to move gears 28 and 40 to the trip position.

Preset counters No. 1 and No. 2 are so set on dials 32 and 45 to require 300 impulses in coils 22 or 34 to trip arm 47 and 49.

Therefore dial 14 on RFC—1 will record the number of lineal feet of strip traveling over guide roll A while Preset counter No. 1 is measuring 300 impulses. When Preset counter No. 1 transfers to Preset counter No. 2, then RFC—2 receives impulses to record the number of lineal feet passing over guide roller A, while Preset counter No. 2 is measuring 300 impulses. At the end of this 300 count, the number of feet on RFC—1 is subtracted from the number of feet on RFC—2, and this answer multiplied by a constant K obtained from the equation derived and described as follows:

From the equation:
Area of the ring between two circles of radius $R_1$ and $R_2$ one of which encloses the other equals $Pi(R_2^2 - R_1^2)$, the following equation can be set up:

(1) $$A_1 = \pi(R_1^2 - R^2) \text{ sq. ft.}$$

and (2) $$A_2 = \pi(R_2^2 - R_1^2) \text{ sq. ft.}$$

Where R is the radius from the center of the mandrel to any point on the coil where the checking is started in feet:

$R_1$ equals R plus Gauge (G) times mandrel revolutions ($Rev_1$); and $R_2$ equals R plus G $Rev_1$ plus Gauge (G) times mandrel revolutions ($Rev_2$) between $R_1$ and $R_2$ in feet.

Substituting in Equations 1 and 2:

(3) $$A_1 = \pi[(R + G\ Rev_1)^2 - R^2] \text{ sq. ft.}$$

(4) $$A_2 = \pi[(R + G\ Rev_1 + G\ Rev_2)^2 - (R + G\ Rev_1)^2] \text{ sq. ft.}$$

It can be assumed that $A_1$ = Gauge (G) times the feet ($S_1$) between R and $R_1$; and $A_2$ = Gauge (G) times the feet ($S_2$) between $R_1$ and $R_2$.

Substituting in (3), we have $$S_1 G = 2\pi R G\ Rev_1 + \pi(G\ Rev_1)^2 \text{ in sq. ft.}$$

or, solving for R (5) $$R = \frac{S_1}{2\pi\ Rev_1} - \frac{G\ Rev_1}{2} \text{ in feet}$$

Substituting (5) in (4):

$$A_2 = \pi\left[\left(\frac{S_1}{2\pi\ Rev_1} - \frac{G\ Rev_1}{2} + G\ Rev_1 + G\ Rev_2\right)^2 - \left(\frac{S_1}{2\pi\ Rev_1} - \frac{G\ Rev_1}{2} + G\ Rev_1\right)^2\right]$$

Substituting for $A_2$ and clearing:

$$S_2 G = \frac{\pi(S_1 + \pi G\ Rev_1^2 + 2\pi G\ Rev_1\ Rev_2)^2 - (S_1 + \pi G\ Rev_1^2)^2}{(2\pi\ Rev_1)^2}$$

expressed in sq. ft.

Also, the following equation can be set up:
Substituting for $A_2$ and clearing:

$$S_2 G = \frac{4\pi^2 G\ Rev_1\ Rev_2\ S_1 + 4\pi^3 G^2 Rev_1^3 Rev_2 + 4\pi^3 G^2 Rev_1^2 Rev_2^2}{4\pi^2\ Rev_1^2}$$

expressed in sq. ft.

$$G = \frac{Rev_1\ S_2 - Rev_2\ S_1}{\pi\ Rev_1^2\ Rev_2 + \pi\ Rev_1\ Rev_2^2} \text{ feet}$$

or $$G = 12 \frac{(Rev_1\ S_2 - Rev_2\ S_1)}{\pi\ Rev_1^2\ Rev_2 + \pi\ Rev_1\ Rev_2^2} \text{ inches}$$

This last is the general equation:
Using the general equation and substituting the preset counter settings, i. e. $Rev_1$ equals 300 and $Rev_2$ equals 300, we have $$G \text{ equals } (S_2 - S_1)\ 0.00002122$$

From this equation, the graph of Figure 7 was prepared. Similar graphs have to be prepared for any desired preset counter setting, or the general equation can be used for any set up as long as the respective revolutions and feet are measured simultaneously in each area.

We claim:

1. Apparatus for enabling determination of average thickness of metallic strip passing to a reel from a roll stand while the strip is moving and being continuously coiled on the reel, which comprises in combination, counting means for counting revolutions of the reel, instrumentalities for measuring lineal feet of strip passing to the reel during the counting of the revolutions, electrical connections for the said revolution counting means and lineal feet measuring instrumentalities for producing simultaneous operation thereof, and control instrumentalities therefor for initiating starting thereof and for stopping the revolution counting means and the lineal feet measuring instrumentalities after the counting of a predetermined number of revolutions of the reel.

2. Apparatus for enabling determination of average thickness of metallic strip passing to a reel from a roll stand while the strip is continuously moving and being continuously coiled on the reel, which apparatus comprises, in combination, first and second preset counting instrumentalities for counting revolutions of the reel, first and second recording foot counters for measuring lineal feet of strip during a predetermined number of revolutions of the reel, instrumentalities for switching the counting and measuring from the first preset counter and first recording foot counter responsively to the first preset counter completing the counting of the said predetermined number of revolutions of the reel, and means for stopping operation of the second preset counter and second recording foot counter responsively to completion of counting of the predetermined number of revolutions of the reel by the second preset counter.

3. Apparatus for enabling determination of average thickness of metallic strip passing to a reel from a roll stand while the strip is continuously moving and being continuously coiled on the reel, which apparatus comprises, in combination, first and second preset counting instrumentalities for counting revolutions of the reel, first and second recording foot counters for measuring lineal feet of strip during a predetermined number of revolutions of the reel, control switch instrumentalities for controlling operation of the first and second preset counting instrumentalities and first and second recording foot counters, a starting switch for initiating the said operation, electrical connections for the said switches and for the first and second preset counting instrumentalities and for the first and second recording foot counters, means for automatically transferring the counting and measuring from the first preset counting instrumentalities and first recording foot counter to the second preset counting instrumentalities and second recording foot counter responsively to completion of counting of a predetermined number of revolutions of the reel, while the reel continues to revolve, and means on the control switches for stopping actuation of the said second preset counting instrumentalities and second recording foot counter responsively to completion of counting of a second predetermined number of revolutions of the reel.

4. Apparatus for enabling determination of average thickness of strip passing to a reel while the strip is moving and being continuously coiled on the reel, which comprises in combination, counting means for counting revolutions of the reel, instrumentalities for measuring the length of strip passing to the reel during the counting of the revolutions, means for producing simultaneous operation of the said revolution counting means and length measuring instrumentalities, and control instrumentalities therefor for initiating starting thereof and for stopping the revolution counting means and the length measuring instrumentalities after the counting of a predetermined number of revolutions of the reel.

5. Apparatus for enabling determination of average thickness of strip passing to a reel while the strip is moving and being continuously coiled on the reel, which comprises in combination, counting means for counting revolutions of the reel, instrumentalities for measuring the length of strip passing to the reel during the counting of the revolutions, means for producing simultaneous operation of the said revolution counting means and length measuring instrumentalities, and control instrumentalities for simultaneously stopping the revolution counting means and the length measuring instrumentalities after the counting of a predetermined number of revolutions of the reel.

6. Apparatus for enabling determination of average thickness of strip passing to a reel while the strip is continuously moving and being continuously coiled on the reel, which apparatus comprises, in combination, first and second preset counting instrumentalities for counting revolutions of the reel, first and second instrumentalities for measuring the length of strip during a predetermined number of revolutions of the reel, instrumentalities for switching the counting and measuring from the first preset counter and first length measuring instrumentality when the first preset counter completes the counting of the said predetermined number of revolutions of the reel, and means for stopping operation of the second preset counter and second length measuring instrumentality when the second preset counter completes the counting of the predetermined number of revolutions of the reel.

ROBERT W. CROTHERS.
EDWIN E. VONADA.